May 18, 1965   E. V. BERGSTROM   3,183,545
EASY SLIDE CASTER

Filed June 29, 1961   3 Sheets-Sheet 1

INVENTOR.
ERIC V. BERGSTROM

May 18, 1965   E. V. BERGSTROM   3,183,545
EASY SLIDE CASTER

Filed June 29, 1961   3 Sheets-Sheet 2

INVENTOR.
ERIC V. BERGSTROM

May 18, 1965  E. V. BERGSTROM  3,183,545
EASY SLIDE CASTER

Filed June 29, 1961  3 Sheets-Sheet 3

INVENTOR.
ERIC V. BERGSTROM

United States Patent Office 3,183,545
Patented May 18, 1965

3,183,545
EASY SLIDE CASTER
Eric Victor Bergstrom, Byram Shore Road, Byram, Conn.
Filed June 29, 1961, Ser. No. 120,751
3 Claims. (Cl. 16—42)

This invention pertains to a design of an easy slide caster for use under domestic refrigerators and similar heavy objects, where periodically the object must be moved by sliding on a resilient floor surface such as a linoleum or similar compressible material. The invention incorporates methods of affixing slide casters to such items and to furniture utilizing the easy slide casters described in my patent application Serial No. 70,079, filed November 19, 1960, now abandoned for use on carpeted floors.

The invention includes, also, methods of minimizing the adverse effect of the static coefficient of friction which is higher than the kinetic coefficient of friction when sliding a refrigerator on slide casters, and a means of protecting the low friction contact surface I use on such casters against damage due to floor dirt with consequent loss of low friction properties.

A normal household chore is the moving of a domestic refrigerator periodically on a kitchen floor for the purpose of cleaning behind it, an operation which often is beyond the strength of a housewife. For example, I have concluded from tests that a lateral force as high as 188 lbs. is required to begin sliding a refrigerator weighing 400 lbs., and a force of 88 lbs. is required to keep it sliding without casters. When the refrigerator is equipped with my slide casters, these forces are reduced to 50 lbs. and 40 lbs. or less, respectively. The detailed method of obtaining this result is described herein.

Slide casters for use on linoleum covered or carpeted floors require a positive attachment or affixing method, as in sliding the item of equipment lack of uniformity in floor level can cause the casters to become detached. In application Serial No. 70,079, now abandoned, I use a metal prong detail, and in this application improve on this detail to make it more widely applicable with quick facility. Also, I show another method applicable to affixing any type of slide caster to almost any type of object which is to be slid.

Figure 1:
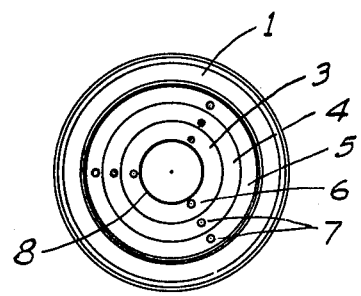
Figure 2:
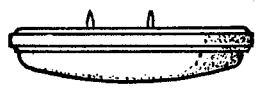
Figure 3:
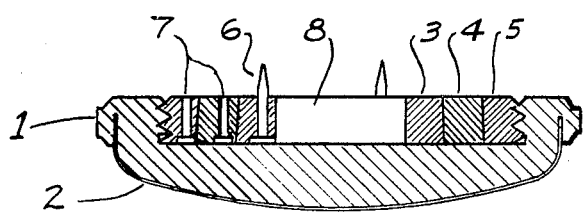

The improvement in the prong type attachment is shown in FIGS. 1, 2, and 3, wherein FIG. 1 is a top view, FIG. 2 a side view, and FIG. 3 a cross section through the caster with the principles detailed.

Figure 4:
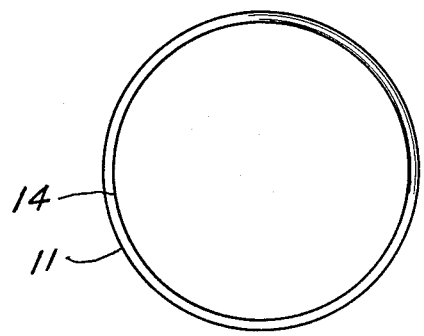
Figure 5:
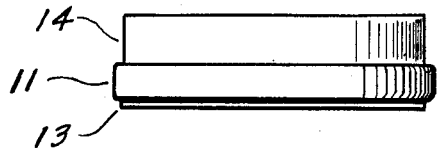
Figure 6:
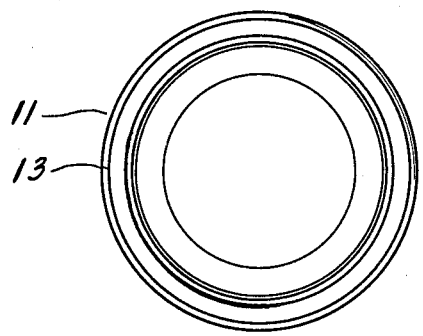
Figure 7:
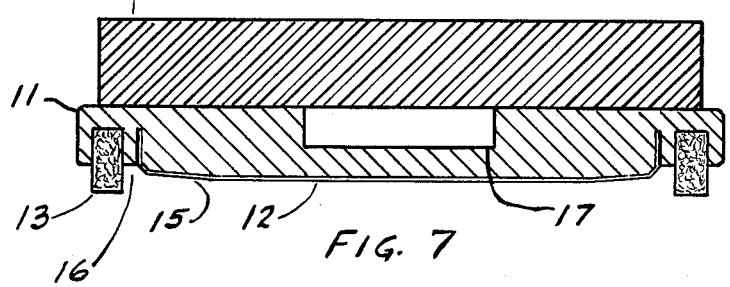

The refrigerator slide caster is shown in FIGS. 4, 5, 6, and 7, wherein FIG. 4 is a top view of the caster, FIG. 5 a side view, FIG. 6 a bottom view, and FIG. 7 a cross section through the caster with the principles detailed.

Figure 8:
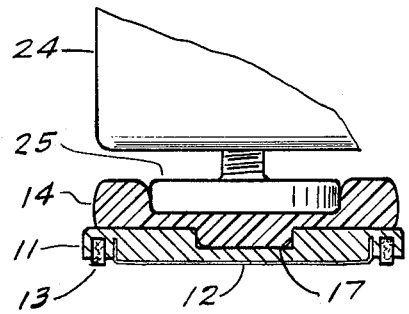
Figure 9:
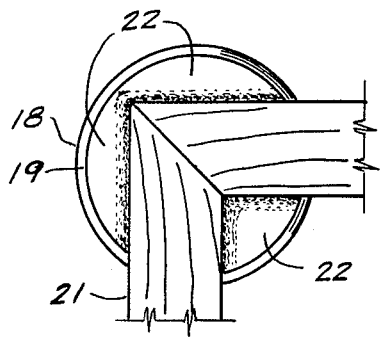
Figure 10:
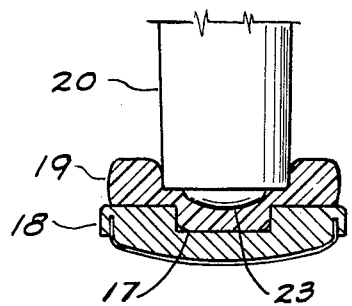
Figure 11:
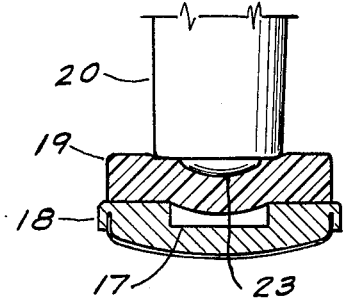

The method of attaching any slide caster to an object to be moved is shown in FIGS. 4, 5, 7, 8, 9, 10 and 11. In FIG. 8 a slide caster is shown in place in cross section under a refrigerator foot. FIG. 9 is a plan view showing a box corner for an item of furniture in place on top of a caster. FIG. 10 and FIG. 11 show carpet type slide casters in cross section in two conditions of affixation laterally to a furniture leg.

The FIG. 3 attachment method for easy slide casters is designed to fit a wide variety of furniture leg shapes, most of which have metal buttons on the bottom. Furniture legs may be 1″ to 4″ in base width, and the metal button diameters usually range from 3/8″ to 1″ diameter, and in varying combinations with the base width of the furniture leg. As my application Serial No. 70,079 specifies leg support on an annular caster bearing area for effective results, either a wide variety of the cavity sizes and prong radii shown in Serial No. 70,079 is necessary, or a method is required for adjusting at the point of use the cavity diameter and prong radius. The latter procedure is claimed in this invention.

Referring to FIGS. 1 and 3, part 1 is the caster base material, part 2 is a Teflon film coating sprayed on or molded into the base at the edge. Parts 3, 4, and 5 are individual rings, with part 5 threaded to part 1. Parts 3 and 4 are tapered, large end down, and locked in place, therefore, when part 5 is screwed to part 1. In the assembly shown, cavity 8 is a clearance pocket for the metal button on furniture legs, and for example is 9/16″ diameter and 3/16″ deep. This assembly is suitable for a furniture leg having a metal button 1/2″ diameter and smaller, and a leg width of 1 1/8″ and larger, and when in use the furniture leg will be supported on an annular caster bearing area, with prongs 6 imbedded into the leg. The assembly is merchandised in this manner, and often will not fit because metal button diameters often are large. In that case the assembly is unscrewed, part 3 is discarded, and the prong pins 6 moved to the next outward set of holes 7 in ring 4. Likewise, parts 3 and 4 may be discarded, and prongs 6 relocated in holes 7 in ring 5. The annular width of rings 3, 4, and 5 is 5/32″ providing possible button clearance cavity diameters of 9/16″ 7/8″ and 1 3/16″ and fitting furniture leg minimum widths of 1 1/8″, 1 7/16″ and 1 5/8″. These dimensions can be varied by modifying the width of the annular rings.

While particularly adaptable to slide casters for carpeted floors, the FIG. 3 attachment assembly can be used on the FIG. 7 type caster base for linoleum or similar type floors. Applications can be for office furniture, kitchen tables, and similar objects.

Another method of affixing, but not attaching, many types of casters to a variety of furniture and equipment support legs is shown in FIGS. 4, 5, 7, 8, 9, 10, and 11. This invention provides for almost universal effective use on all leg shapes of such objects, and is used with both the FIG. 7 type caster base for linoleum and similar floors, and the FIG. 3 type caster base for carpeted floors.

FIGS. 10 and 11 show in section a furniture leg 20, resting on a slide caster 18 for carpeted floors in the low and high positions. Two positions are shown as levelness of floors is variable, and often an item of furniture with four legs is supported predominantly on only two of the legs. Adjustment for this condition is provided by a sponge rubber bearing pad 19. The heavily loaded position for two legs is shown in FIG. 10 and the lightly loaded position is shown in FIG. 11. It can be observed that the sponge rubber pad in deforming forms its own caster cup, said cup having a depth of 1/16″ to 5/16″, depending on loading, with an uncompressed sponge rubber pad thickness of 3/8″ to 1/2″. Cavity 17 is provided for clearance to cause the sponge rubber in the center under the metal button on the leg to be only lightly compressed, as compared with the rubber under the furniture leg bearing area surrounding the metal button. This principle prevents the FIG. 10 type caster from rocking as sliding action takes place, as the load is carried substantially on the annular bearing area of the furniture leg outside of the metal button area. Cavity 17 in FIG. 7 and in FIG. 10 is 1/2″ to 1 1/4″ in top diameter and 1/8″ to 1/4″ deep.

When sliding the FIG. 10 assembly on a carpet, the coefficient of friction of the Teflon coated surface against the carpet is 0.15 to 0.20 as described in application Serial 70,079. The combination of button and furniture leg indentation and cupping into the sponge rubber provides an affixation in the lateral direction which is equivalent to a coefficient of friction many times larger than 0.15 to 0.20. Consequently, the caster slides readily on carpet without becoming detached from the furniture leg. During sliding the sponge rubber under each leg compresses or decompresses to accommodate the levelness of the floor.

FIG. 9 shows in plan how this caster affixes itself to another type of furniture support point, a boxed corner without legs. Sponge rubber pad 19 on caster base 18 depresses under the load of the furniture corner 21. Pad areas 22 become raised areas and effectively cup furniture corner 21.

FIG. 8 shows a refrigerator type caster in section as described in greater detail later herein. Sponge rubber pad 14 on base 11 surrounds refrigerator adjusting screw base 25, which is attached to refrigerator corner 24. This detail provides the same cupping feature and automatic vertical adjustment for unlevel floors as the FIG. 10 assembly. I have demonstrated, also, that when flat bearing surfaces are applied to the top of the FIG. 8 type caster, and the cupping feature does not exist, there is a much greater coefficient of friction between the sponge rubber and this surface than between the bottom surface and the floor. Consequently, the caster does not become detached when sliding.

Sponge rubber varies in grades of compressibility, and for refrigerator loads a medium grade is used while for lighter loads applicable to furniture a softer grade is used. The selection of grade normally is based on obtaining $3/16''$ to $5/16''$ compression for a caster load of 100 lbs. as applicable to refrigerators, and $3/16''$ to $5/16''$ for a load of 10 to 15 lbs. as applicable to furniture but in any case the load should compress the sponge rubber at least $1/16''$. The uncompressed thickness of the sponge rubber pad can be varied between $1/8''$ and $1''$, but I have found a thickness of $1/4''$ to $1/2''$ to be preferred. The sponge rubber pad is permanently cemented to the caster base, and preferably covers a major portion of the caster base top surface area.

Referring to FIG. 7 details are shown which insure a low coefficient of friction on the bottom surface of a refrigerator caster by selection of coating and by keeping this surface free of floor dirt and grit. In FIG. 7 the structural base material 11, which can be a resin such as polystyrene, is coated on the underside with a film 12 of Teflon. This film may be a sprayed or molded coating, but as shown in FIG. 7 it is a film $0.003''$ to $0.005''$ thick turned up at the edges and molded into the base material. The base material bottom surface is sloped upward in the outer 25% to 50% area of annular shape 15, and in molding the Teflon film shapes and bonds to this surface.

Adjacent to the outer edge of the Teflon film an annular void space 16 is provided, and outside of this void space a felt ring 13 is inserted into a groove in base material 11. Before the caster is in place under a refrigerator the felt ring projects about $1/16''$ beyond the Teflon coated face. When the caster is in place the felt ring compresses against the floor with a minor bearing force, and the load is supported predominantly on the Teflon face. When sliding the object on these casters there is sufficient compression in the felt ring to press it firmly against the floor so that it acts as a wiper ring, brushing dirt and grit ahead and aside and preventing lodgment between the floor surface and the Teflon surface, which would destroy the low friction characteristic of the Teflon surface.

Annular void 16 is provided because as the caster slides the felt ring deforms opposite to the direction of sliding, and trails slightly at the back of the leading edge. This trailing edge of felt can be caught between the floor and the Teflon surface if an annular clearance void were not provided between the felt ring and the Teflon edge.

In FIG. 7 the sponge rubber pad 14 is cemented to base material 11, and covers cavity 17, the purpose of which has been previously described. The cavity is not needed on refrigerator casters, as metal buttons are not used on refrigerator bearing points, but for supporting other objects such as kitchen furniture, cavity pocket 17 is effective in distributing the bearing load over the bottom of the furniture leg.

It can be seen that in the FIG. 7 type caster the sponge rubber bearing area presses the Teflon surface flat against the floor, whatever the degree of levelness of the floor. Alternatively, in the FIG. 10 type caster the sponge rubber pad in pressing uniformly against annular bottom area of the furniture leg, also presses the center of the Teflon surface against the carpet, but maintains levelness with the furniture leg base. This eliminates rocking of the caster which would vitiate the effect of the slope of the Teflon coated bottom as described in application Serial 70,079.

The annular sloped area 15 in the FIG. 7 caster has a specific purpose. It is readily understood that a linoleum type covering such as is used in kitchens is a relatively soft, resilient, material applied to the floor partly for foot comfort of occupants. Under load this type of surface compresses to some degree, and a load applied by refrigerator supports points is typical. When sliding loads on such a floor, the bearing surface in effect continuously climbs a slope resulting from a depression caused by the load. This climbing action and the lateral force represented to accomplish it, combined with the basic coefficient of friction between the caster base surface and the floor surface, represent the total force required to slide the object on the floor. The basic coefficient of static and kinetic friction for a fluorinated hydrocarbon such as Teflon can be 0.04 to 0.10, expressed against steel which, however, does not deform in the manner of linoleum.

In order to ascertain the best slope for the annular area 15, five caster base shapes were tested under loads of 47 lbs. and 64 lbs. The caster bases were $1¾''$ diameter. The first two had flat bottom surfaces, and one was not coated with Teflon. The others were coated and sloped upward on annular area 15 at angles of $2½°$, $5°$, and $7½°$, respectively, on an annular width of $¼''$. The outside edge of all casters was bevelled $1/32'' \times 45°$. The tests were made in several locations on the area of an asphalt tile floor which had been in service for eight years.

It was found in over 100 separate sliding tests that the four Teflon coated shapes had sliding or kinetic coefficients of friction of 0.09 to 0.10, the differences being within experimental error. There was a marked difference, however, in the static coefficients of friction. The flat bottom shape had a static coefficient of 0.225, the $7½°$ slope 0.188, the $5°$ slope 0.171, and the $2½°$ slope 0.126. The slope height for the $2½°$ slope is $0.011''$ in $¼''$, and I conclude that the indentation of the caster in the floor surface was something less than 0.011 as this shape was easiest to start sliding. This caster climbed out of the indentation on a slope of $.011''$ in $0.250''$, a 4.3% grade. The slope for the $7½°$ angle and the $5°$ angle were equivalent to grades of 13% and 8.7% respectively. Consequently, I conclude that a slope of $2½°$ to $5°$ is the desirable range, and that the $2½°$ slope is preferred for easiest sliding of a refrigerator. The uncoated shape had a kinetic coefficient of friction of 0.22 and a static coefficient of friction of 0.47.

In terms of loads to slide a refrigerator weighing 400 lbs. the following figures result from these data:

| Caster Shape | Coating | Force to Start Sliding, lbs. | Force to Maintain Sliding, lbs. |
| --- | --- | --- | --- |
| Flat bottom | None | 188 | 88 |
| Do | Teflon | 90 | 40 |
| 7½° annular slope | do | 75 | 40 |
| 5° annular slope | do | 68 | 40 |
| 2½° annular slope | do | 50 | 40 |

A further feature of the $2½°$ slope in combination with the sponge rubber support pad is that the sponge rubber resilience enables a housewife to slide a refrigerator with smaller forces than shown above. This is done by applying successive smaller horizontal forces which vibrate the refrigerator horizontally on the sponge rubber and cause the casters to "inch" along the floor. The energy explanation for the "inching" effect is that an assumed force of 32 lbs. can act over a distance of horizontal sponge rubber movement of 1/32", and accumulate one inch pound of energy in the rubber. This energy then can be released and applied to the caster surface at the floor level and can be equal to 64 lb. acting over a distance of 1/64" movement of the caster. In effect, therefore, the sponge rubber pad contributes a leverage factor.

Casters made according to this invention are 1¼" to 4" in diameter, the most common range being 1½" to 2¼". It is understood that where the term "Teflon" is used the material may be a fluorinated hydrocarbon, or any type of uniform resinous, inert material having a coefficient of friction, expressed against steel, of 0.04 to 0.10. Likewise, the terms "sponge rubber" and "felt" are considered to be sufficiently broad in meaning to include other materials of approximately equivalent compressibility and resiliency characteristics.

I claim:
1. A caster comprising a rigid structural base member having an upper and a lower side, a uniform coating placed on a major portion of the central surface of the lower side of said base member, said coating being of a resinous material having a coefficient of friction of less than 0.10, expressed against steel, said lower side of said base member also having a compressible felt ring mounted thereon, said ring and the surface of said coating lying in the same plane when said ring is compressed, and said ring extending out of said plane when a force is not exerted thereon, said felt ring completely surrounding said coating and acting as a floor wiping means to prevent an accumulation of friction producing particles on the surface of said coating.
2. A caster as in claim 1, said coating having an outer annular area sloped at an angle of less than 5°.
3. A caster as in claim 1, said caster having on the upper side of said base member a sponge rubber pad secured thereto.

References Cited by the Examiner
UNITED STATES PATENTS

| | | | |
|---|---|---|---|
| 1,402,998 | 1/22 | Anderson | 16—42 |
| 1,546,169 | 7/25 | Dooley | 16—42 |
| 1,749,751 | 3/30 | Bergsten | 16—44 |
| 1,891,643 | 12/32 | Henrikson | 16—42 |
| 1,969,266 | 8/34 | Herold | 16—42 |
| 1,982,138 | 11/34 | Herold | 16—42 |
| 2,135,945 | 11/38 | Miller | 16—42 |
| 2,728,166 | 12/55 | Malla | 16—42 |
| 2,827,655 | 3/58 | Ustica | 16—42 |

DONLEY J. STOCKING, *Primary Examiner.*

M. HENSON WOOD, JR., *Examiner.*